July 11, 1944.   W. D. BARRETT   2,353,382
TIMING METHOD AND APPARATUS
Filed May 27, 1942
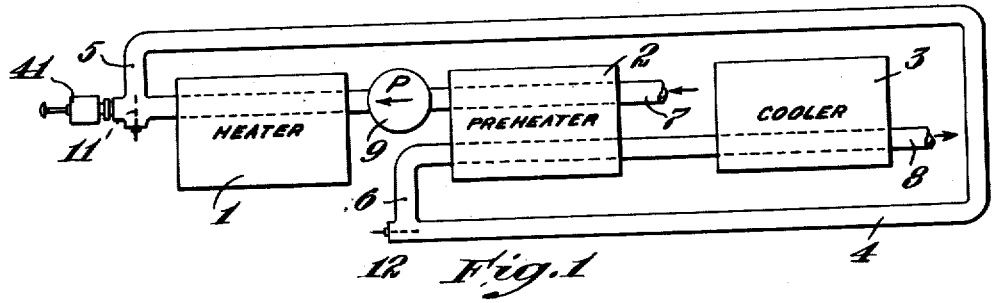
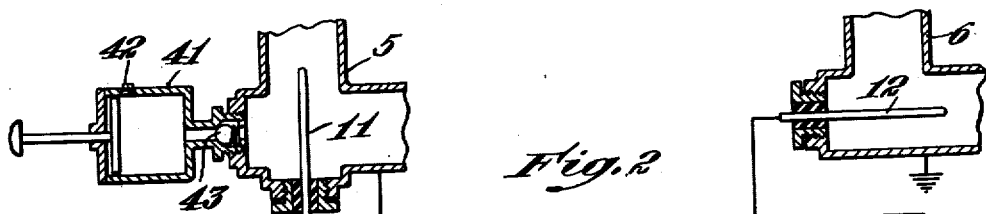
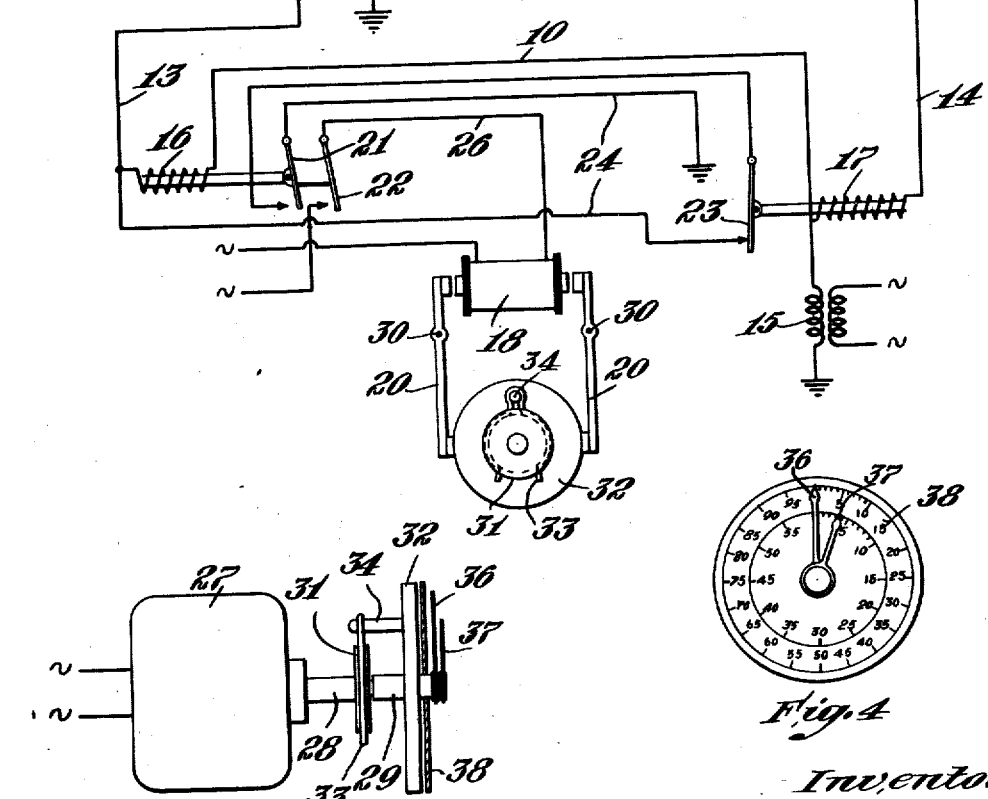
Inventor
Witmer D. Barrett
by Roberts, Cushman & Woodbury
Attys.

Patented July 11, 1944

2,353,382

UNITED STATES PATENT OFFICE 2,353,382

TIMING METHOD AND APPARATUS

Wilmer D. Barrett, Reading, Mass., assignor to Whiting Milk Company, Charlestown, Mass., a corporation of Delaware Application May 27, 1942, Serial No. 444,729

14 Claims. (Cl. 99—252)

In various kinds of apparatus through which a stream of liquid is circulated, it is often desirable to determine the time required for the liquid to pass from one location to another location farther along the circuit. For example the most practical way of pasteurizing milk is to circulate the milk continuously through a circuit comprising a heater, a cooler and an intermediate holding conduit in which the temperature of the milk is maintained substantially constant for the time required to pasteurize the milk; and to determine whether the temperature is maintained for the required time, it is necessary to determine the time required for the milk to traverse the length of the holding conduit. Heretofore this has been accomplished by injecting coloring matter into the stream at the entrance end of the conduit and then to note, by the use of a transparent window or a petcock, how long it takes for the injection of coloring matter to appear at the exit end of the conduit. However this method is not satisfactory, chiefly for the reasons that it is unsanitary and inaccurate.

Objects of the present invention are to provide measuring apparatus which is simple and economical to manufacture, which is facile and accurate in use, which can be easily cleaned and is therefore sanitary and which is generally superior to apparatus heretofore employed for similar purposes.

According to the present invention an indicating agent is injected into the stream and, at successive locations along the conduit, the apparatus comprises starting and stopping detectors which are responsive to the indicating agent as it passes through the conduit. The apparatus also comprises a chronometer indicator together with means controlled by the starting detector for starting the indicator and means controlled by the stopping detector for stopping the indicator, whereby the time required for the passage of the liquid from the first to the second location is automatically indicated in response to the injection of the aforesaid indicating agent. When the indicating agent is in the form of coloring matter, the detectors preferably comprise photoelectric devices operating through transparent windows in the conduit. However the detectors preferably comprise electrodes projecting into the liquid stream in insulated relationship to the conduit, in which case the indicating agent preferably comprises salt water or other material for increasing the conductivity of the liquid stream. In the case of pasteurizing apparatus the detectors are located at the opposite ends of the holding conduit and the means for injecting the detecting agent may be permanently associated with the conduit at the location of the starting electrode or somewhat in advance of that location.

In a more specific aspect the apparatus may involve a slip coupling between the chronometer and the indicator and a brake between the coupling and the indicator for preventing the indicator from being actuated by the chronometer, in which case the brake is automatically released when the charge of indicating agent passes the starting detector and the brake is automatically applied when the charge of indicating agent reaches the stopping detector, whereby the time required for the passage of the liquid between the two locations is automatically indicated in response to the injection of the indicating agent. The slip coupling may be a fluid or magnetic clutch in which the driving force is transmitted by a fluid or magnetic flux but ordinarily a friction coupling is preferable.

For the purpose of illustration a typical embodiment of the invention is shown in accompanying drawing in which:

Fig. 1 is a diagrammatic view of pasteurizing apparatus;

Fig. 2 is a circuit diagram showing parts of the apparatus in section and parts in elevation;

Fig. 3 is a side view of the chronometer; and

Fig. 4 is a face view of the chronometer.

The particular embodiment of the invention chosen for the purpose of illustration comprises a heater 1, a preheater 2, a cooler 3, a holding conduit 4 having an entrance end 5 and an exit end 6, a conduit 7 for supplying raw milk to the system, a conduit 8 for delivering pasteurized milk from the system, and a pump 9 for circulating milk through the system. In the heater 1 the temperature of the milk is raised to a predetermined degree and this temperature is maintained while the milk flows through the conduit 4 from the entrance end 5 to the exit end 6. Then the milk enters the preheater 2 where a part of its heat is transferred to the raw milk entering through the conduit 7. After being partly cooled in the preheater, the pasteurized milk continues through the cooler 3 where it is reduced to the desired temperature.

According to this invention electrodes 11 and 12 are mounted in the inlet and outlet ends of the holding conduit in insulated relationship to the conduit. Connected to the electrodes respectively are starting and stopping circuits 13 and 14 containing starting and stopping relays 15 and 17 for controlling a brake magnet 18 associated with the chronometer. The starting relay 16 comprises two switches 21 and 22 which are normally open and the stopping relay 17 comprises a switch 23 which is normally closed. The switches 21 and 23 control a holding circuit for the starting relay 16 and the switch 22 controls the circuit 26 of the brake magnet 18.

The chronometer comprises a motor 27, which may be driven either electrically or by a spring, two shafts 28 and 29 which, while their ends preferably telescope together, are free to rotate relatively to each other, a grooved friction disc 31 fast to the shaft 28, a brake disc 32 fast to the shaft 29, a spring 33 fast to a pin 34 on the brake disc 32 and frictionally engaging in the groove in the periphery of the friction disc 31, and indicators 36 and 37 rotating in front of a calibrated dial 38 and driven by the shaft 29 through suitable gearings not shown. While the rate of rotation of the indicators 36 and 37 may be adjusted to suit different conditions, for most purposes the indicator 36 preferably makes one revolution per second and the indicator 37 makes one revolution per minute.

The indicating agent, which preferably comprises a saturated solution of trisodium phosphate, may be injected into the liquid stream by means of a piston and cylinder device 41 having a filling plug 42 and a check valve 43. Ordinarily a charge of one point of the salt solution is sufficient to operate the relays as the charge passes the two electrodes successively.

To take a time measurement the motor 27 is started by a switch not shown and, if the brakes were not applied to the disc 32, the motor would drive the indicating hands 36 and 37 by virtue of the frictional engagement between the spring 33 and the friction disc 31. However the brakes 20, which are pivoted at 30, normally hold the brake disc 32, the pin 34, the spring 33, the shaft 29, and hands 36 and 37 against rotation, causing the friction disc 31 to slip on the spring 33.

When a charge of indicating agent is introduced into the entrance end of the holding conduit by the device 41, the starting relay 16 is energized by current flowing from the ground through the secondary of the transformer 15, conductor 19, relay 16, conductor 13, electrode 11, the liquid in the conduit, and thence through the conduct back to ground. When the switch 22 is closed by the relay 16 the brake magnet 18 is energized through the circuit 26, thereby releasing the brake and permitting the indicator hands 36 and 37 to start rotating. The switch 21 closes the holding circuit 24 for the relay 16 so that the relay cannot become deenergized until the stopping relay 17 is energized when the charge of indicating agent reaches the stopping electrode 12, whereupon the switch 23 is opened, the relay 16 is deenergized, switches 21 and 22 are opened, the brake magnet 18 is deenergized, the brakes are applied and the indicating hands stop. As soon as the charge of indicating agent has passed the stopping electrode 12, the relay 17 is restored to its normal deenergized position. Thus the indicating hands remain at the positions which directly indicate the exact time required for the charge of indicating agent to traverse the length of the holding conduit 4. The chronometer may comprise any suitable mechanism for returning the indicator hands to zero position in response to a push button.

It should be understood that the present disclosure is for the purpose of illustration only and that this invention includes all modifications and equivalents which fall within the scope of the appended claims.

I claim:

1. In milk pasteurizing apparatus comprising a heater, a cooler, means interconecting the heater and cooler including a holding conduit in which the temperature of the milk is maintained for a predetermined time, and means for circulating a stream of milk through the heater, conduit and cooler in series, the combination of means for injecting an indicating agent into said stream near the entrance to said conduit, starting and stopping detectors responsive to the passage of said indicating agent through the conduit, the detectors being located near the entrance and exit ends of the conduits respectively, a chronometer indicator, circuit connections for controlling said indicator including a switch for starting the indicator and a switch for stopping the indicator, means controlled by the starting detector for operating the first switch and means controlled by the stopping detector for operating the second switch, whereby the time required for the passage of the milk through the holding conduit is automatically indicated in response to the injection of said indicating agent.

2. In milk pasteurizing apparatus comprising a heater, a cooler, means interconnecting the heater and cooler including a holding conduit in which the temperature of the milk is maintained for a predetermined time, and means for circulating a stream of milk through the heater, conduit and cooler in series, the combination of means for injecting an indicating agent into said stream near the entrance to said conduit, starting and stopping detectors responsive to the passage of said indicating agent through the conduit, the detectors being located near the entrance and exit ends of the conduit respectively, a chronometer having an indicator, a slip coupling between the chronometer and indicator, a brake between the coupling and indicator for preventing the indicator from being actuated by the chronometer, means controlled by the starting detector for releasing said brake, and means controlled by the stopping detector for applying the brake, whereby the time required for the passage of the milk through the holding conduit is automatically indicated in response to the injection of said indicating agent.

3. In liquid treating apparatus comprising a conduit, and means for circulating a stream of liquid through the conduit, the combination of starting and stopping electrodes projecting into the stream at spaced locations along the conduit, means for insulating the electrodes from the conduit, starting and stopping circuits for said electrodes respectively, each circuit including the conduit and the liquid between the electrode and conduit, means at or in advance of the starting electrode for injecting into said stream a charge of material which changes the resistance of the liquid, a chronometer indicator, circuit connections for controlling said indicator including a switch for starting the indicator and a switch for stopping the indicator, means in the starting circuit for operating the starting switch when said charge passes the starting electrode, and means in the stopping circuit for operating the stopping switch when the charge passes the stopping electrode, whereby the time required for the passage of liquid from the starting electrode to the stopping electrode is automatically indicated in response to the injection of said charge.

4. In liquid treating apparatus comprising a conduit, and means for circulating a stream of liquid through the conduit, the combination of starting and stopping electrodes projecting into the stream at spaced locations along the conduit, means for insulating the electrodes from the conduit, starting and stopping circuits for said electrodes respectively, each circuit including the conduit and the liquid between the electrode and conduit, means at or in advance of the starting electrode for injecting into said stream a charge of material which reduces the resistance of the liquid, a chronometer motor and indicator, a friction coupling between the motor and indicator, a brake between the coupling and indicator for preventing the indicator from being actuated by the motor, means in the starting circuit for releasing the brake when said charge passes the starting electrode, and means in the stopping circuit for applying the brake when the charge passes the stopping electrode, whereby the time required for the passage of liquid from the starting electrode to the stopping electrode is automatically indicated in response to the injection of said charge.

5. In liquid treating apparatus comprising a conduit, and means for circulating a stream of liquid through the conduit, the combination of starting and stopping electrodes projecting into the stream at spaced locations along the conduit, means for insulating the electrodes from the conduit, starting and stopping circuits for said electrodes respectively, each circuit including the conduit and the liquid between the electrode and conduit, means at or in advance of the starting electrode for injecting into said stream a charge of material which reduces the resistance of the liquid, a chronometer indicator, a starting relay in the starting circuit for starting the indicator when said charge passes the starting electrode, and a stopping relay in the stopping circuit for stopping the indicator when the charge passes the stopping electrode, a holding circuit for the starting relay having a switch which is closed when the starting relay is energized and a switch which is opened when the stopping relay is energized, whereby the time required for the passage of liquid from the starting electrode to the stopping electrode is automatically indicated in response to the injection of said charge.

6. In liquid treating apparatus comprising a conduit, and means for circulating a stream of liquid through the conduit, the combination of starting and stopping electrodes projecting into the stream at spaced locations along the conduit, means for insulating the electrodes from the conduit, starting and stopping circuits for said electrodes respectively, each circuit including the conduit and the liquid between the electrode and conduit, means at or in advance of the starting electrode for injecting into said stream a charge of material which reduces the resistance of the liquid, a chronometer motor and indicator, a slip coupling between the motor and indicator, a brake between the coupling and indicator for preventing the indicator from being actuated by the motor, starting means in the starting circuit for releasing the brake when said charge passes the starting electrode, and stopping means in the stopping circuit for applying the brake when the charge passes the stopping electrode, a holding circuit for the starting means having a switch which is closed when the starting means is energized and a switch which is opened when the stopping means is energized, whereby the time required for the passage of liquid from the starting electrode to the stopping electrode is automatically indicated in response to the injection of said charge.

7. Milk pasteurizing apparatus comprising a heater, a cooler, means interconnecting the heater and cooler including a holding conduit in which the temperature of the milk is maintained for a predetermined time, means for circulating a stream of milk through the heater, conduit and cooler in series, starting and stopping electrodes projecting into the stream at the entrance and exit ends of the conduit, means for insulating the electrodes from the conduit, starting and stopping circuits for said electrodes respectively, each circuit including the conduit and the liquid between the electrode and conduit, means at the entrance end of the conduit for injecting into said stream a charge of material which reduces the resistance of the liquid, a chronometer having an indicator, a slip coupling between the chronometer and indicator, a brake between the coupling and indicator for preventing the indicator from being actuated by the chronometer, means in the starting circuit for releasing the brake when said charge passes the starting electrode, and means in the stopping circuit for applying the brake when the charge passes the stopping electrode, whereby the time required for the passage of liquid through the holding conduit is automatically indicated in response to the injection of said charge.

8. Milk pasteurizing apparatus comprising a heater, a cooler, means interconnecting the heater and cooler including a holding conduit in which the temperature of the milk is maintained for a predetermined time, means for circulating a stream of milk through the heater, conduit and cooler in series, starting and stopping electrodes projecting into the stream at the entrance and exit ends of the conduit, means for insulating the electrodes from the conduit, starting and stopping circuits for said electrodes respectively, each circuit including the conduit and the liquid between the electrode and conduit, means at the entrance end of the conduit for injecting into said stream a charge of material which reduces the resistance of the liquid, a chronometer indicator, a starting relay in the starting circuit for starting the indicator when said charge passes the starting electrode, and a stopping relay in the stopping circuit for stopping the indicator when the charge passes the stopping electrode, a holding circuit for the starting relay having a switch which is closed when the starting relay is energized and a switch which is opened when the stopping relay is energized, whereby the time required for the passage of liquid through the holding conduit is automatically indicated in response to the injection of said charge.

9. Milk pasteurizing apparatus comprising a heater, a cooler, means interconnecting the heater and cooler including a holding conduit in which the temperature of the milk is maintained for a predetermined time, means for circulating a stream of milk through the heater, conduit and cooler in series, starting and stopping electrodes projecting into the stream at the entrance and exit ends of the conduit, means for insulating the electrodes from the conduit, starting and stopping circuits for said electrodes respectively, each circuit including the conduit and the liquid between the electrode and conduit, means at the entrance end of the electrode for injecting into said stream a charge of material which reduces the resistance of the liquid, a chronometer having an indicator, a slip coupling between the chronometer and indicator, a brake between the coupling and indicator for preventing the indicator from being actuated by the chronometer, a starting relay in the starting circuit for releasing the brake when said charge passes the starting electrode, and a stopping relay in the stopping circuit for applying the brake when the charge passes the stopping electrode, a holding circuit for the starting relay having a switch which is closed when the starting relay is energized and a switch which is opened when the stopping relay is energized, whereby the time required for the passage of liquid through the holding conduit is automatically indicated in response to the injection of said charge.

10. Apparatus for measuring the time required for a charge to flow from one location to another location along a conduit, comprising starting and stopping detectors responsive to the passage of the charge, the starting detector being disposed at said first location and the stopping detector being disposed at said second location, a chronometer indicator, circuit connections for controlling said indicator including a switch for starting the indicator and a switch for stopping the indicator, means controlled by the starting detector for operating the first switch, and means controlled by the stopping detector for operating the second switch, whereby the time required for the passage of liquid from the starting detector to the stopping detector is automatically indicated in response to the passage of said charge.

11. Apparatus for measuring the time required for a charge to flow from one location to another location along a conduit, comprising starting and stopping detectors responsive to the passage of the charge, the starting detector being disposed at said first location and the stopping detector being disposed at said second location, starting and stopping circuits for said detectors respectively, a chronometer indicator, a starting relay in the starting circuit for starting the indicator when said charge passes the starting detector, and a stopping relay in the stopping circuit for stopping the indicator when the charge passes the stopping detector, a holding circuit for the starting relay having a switch which is closed when the starting relay is energized and a switch which is opened when the stopping relay is energized, whereby the time required for the passage of liquid from the starting detector to the stopping detector is automatically indicated in response to the passage of said charge.

12. Apparatus for measuring the time required for a charge to flow from one location to another location along a conduit, comprising starting and stopping detectors responsive to the passage of the charge, the starting detector being disposed at said first location and the stopping detector being disposed at said second location, a chronometer motor and indicator, a slip coupling between the motor and indicator, a brake between the coupling and indicator for preventing the indicator from being actuated by the motor, means controlled by the starting detector for releasing said brake, and means controlled by the stopping detector for applying the brake, whereby the time required for the passage of liquid from the starting detector to the stopping detector is automatically indicated in response to the passage of said charge.

13. Apparatus for measuring the time required for a charge to flow from one location to another location along a conduit, comprising starting and stopping detectors responsive to the passage of the charge, the starting detector being disposed at said first location and the stopping detector being disposed at said second location, starting and stopping circuits for said detectors respectively, a chronometer motor and indicator, a friction coupling between the motor and indicator, a brake between the coupling and indicator for preventing the indicator from being actuated by the motor, means in the starting circuit for releasing the brake when said charge passes the starting detector, and means in the stopping circuit for applying the brake when the charge passes the stopping detector, whereby the time required for the passage of liquid from the starting detector to the stopping detector is automatically indicated in response to the passage of said charge.

14. Apparatus for measuring the time required for a charge to flow from one location to another location along a conduit, comprising starting and stopping detectors responsive to the passage of the charge, the starting detector being disposed at said first location and the stopping detector being disposed at said second location, a chronometer indicator, circuit connections for controlling said indicator including control means responsive to current flow, means controlled by the starting detector for changing the amount of current flowing through said control means to start the indicator, and means controlled by the stopping detector for again changing the amount of current flowing through the control means to stop the indicator.

WILMER D. BARRETT.